United States Patent Office.

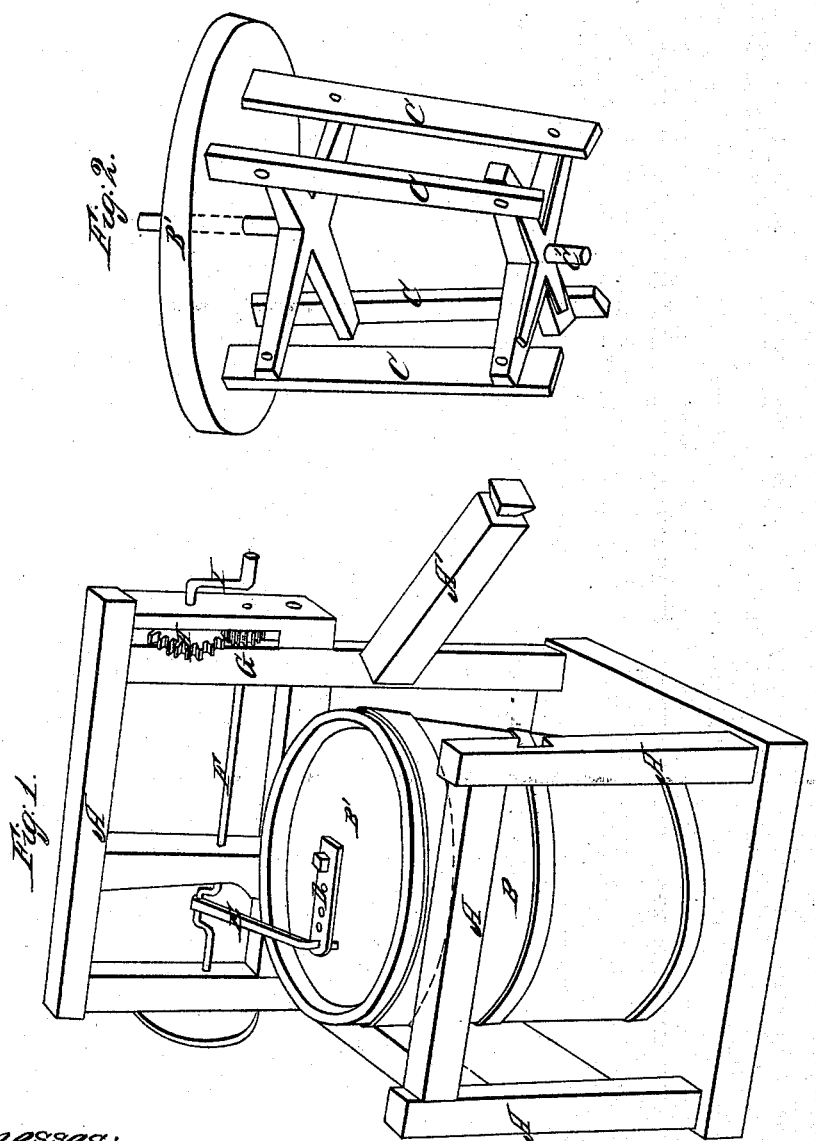

DAVID BARTHOLOMEW AND DAVID C. DINSMORE, OF KIRKVILLE, IOWA.

Letters Patent No. 78,042, dated May 19, 1868.

IMPROVEMENT IN CHURNS.

The Schedule referred to in these Letters Patent and making part of the same.

TO ALL WHOM IT MAY CONCERN:

Be it known that we, DAVID BARTHOLOMEW and DAVID C. DINSMORE, of Kirkville, in the county of Wapello, and State of Iowa, have invented a new and useful Improvement in Churns; and we do hereby declare that the following is a full, clear, and exact description of the same, reference being had to the annexed drawings, making part of this specification, in which—

Figure 1 is a perspective view, and
Figure 2 is a similar view of the dasher.
The same letters are used in both figures for the indication of the same parts.
The following description will enable persons skilled in the art to construct and operate our improved churn.

A is a frame, constructed to hold the barrel of the churn firmly in position, said barrel being countersunk in the bottom of the frame, and enclosed on all sides by the cross-pieces thereof, one of the latter, A', being hinged to the post at one end, and secured at the other so as to permit the convenient removal of the barrel. B is the barrel, covered by the head B', through which passes the shaft of the oscillating-dasher, C. The short shaft C', in the bottom thereof, rests on a step in the bottom of the barrel. The dasher is made with floats, conforming to the sides of the barrel, and attached to the arms of two spiders, as clearly shown in fig. 2. To the end of the shaft projecting through the head B' is attached a horizontal arm, D, with a series of holes, to receive adjustably the hooked end of a connecting-rod, E, which communicates a reciprocating oscillation to the arm and dasher by the movement of the crank on the shaft F. This shaft is driven by a pinion, G, on the end thereof, into which meshes the spur-wheel H, driven by the winch I. The proportion of these wheels determines the rate, and the position of the point of attachment of the connecting-rod E and arm D, the extent of the oscillation of the arm and dasher.

What we claim as our invention, and desire to secure by Letters Patent, is—

The combination of the churn and the frame A, constructed with a removable brace, A', and the arm D, for giving a reciprocating revolution to the dasher, and so adjustably connected with the pitman E and driving-mechanism that the churn may be removed from the frame, substantially as set forth.

In testimony whereof, we have signed our names to this specification in the presence of two subscribing witnesses.

DAVID BARTHOLOMEW,
DAVID C. DINSMORE.

Witnesses:
C. W. RUGGLES,
DANIEL CRAWFORD.